US008596436B2

(12) United States Patent
Grogg et al.

(10) Patent No.: US 8,596,436 B2
(45) Date of Patent: Dec. 3, 2013

(54) IDLE-ABLE AUXILIARY DRIVE SYSTEM

(75) Inventors: John Allen Grogg, LaOtto, IN (US);
Mark James Shewchuck, Charlotte, MI (US)

(73) Assignee: Eaton Corporation, Cleveland, OH (US)

( * ) Notice: Subject to any disclaimer, the term of this patent is extended or adjusted under 35 U.S.C. 154(b) by 400 days.

(21) Appl. No.: 12/944,714

(22) Filed: Nov. 11, 2010

(65) Prior Publication Data
US 2011/0127135 A1    Jun. 2, 2011

Related U.S. Application Data

(63) Continuation-in-part of application No. 12/629,424, filed on Dec. 2, 2009.

(60) Provisional application No. 61/122,861, filed on Dec. 16, 2008.

(51) Int. Cl.
*F16D 25/08*    (2006.01)
*F16D 25/10*    (2006.01)

(52) U.S. Cl.
USPC .............. 192/48.4; 192/48.5; 192/48.604; 192/48.619; 192/53.1; 192/85.49

(58) Field of Classification Search
USPC ............. 192/48.602, 48.603, 48.604, 48.619, 192/53.1, 85.49, 85.53, 85.54
See application file for complete search history.

(56) References Cited

U.S. PATENT DOCUMENTS

| | | | | |
|---|---|---|---|---|
| 4,811,628 A * | 3/1989 | Winkam et al. | ................. | 475/86 |
| 5,125,876 A | 6/1992 | Hirota | | |
| 5,172,787 A * | 12/1992 | Kobayashi | .................... | 180/197 |
| 5,377,800 A * | 1/1995 | Sperduti et al. | ............ | 192/85.63 |
| 5,799,748 A | 9/1998 | Origuchi | | |
| 7,108,115 B2 * | 9/2006 | Ebenhoch et al. | ........... | 192/53.1 |
| 7,357,235 B2 * | 4/2008 | Schmidt et al. | ............. | 192/53.1 |
| 2003/0224896 A1 * | 12/2003 | Chung | ......................... | 475/231 |
| 2008/0230295 A1 | 9/2008 | Grogg | | |

FOREIGN PATENT DOCUMENTS

WO    WO 2008/115963 A1    9/2008

OTHER PUBLICATIONS

Hughs, D., Wydick, K., "Minimizing the Fuel Economy Impact of AWD", SAE 2008 All Wheel Drive Vehicle Symposium, Aug. 21, 2008, pp. 1-15.
International Search Report and Written Opinion of the International Searching Authority, mailed Jul. 6, 2010, Application No. PCT/IB2009/007762 filed Dec. 15, 2009.

* cited by examiner

*Primary Examiner* — Richard M. Lorence
(74) *Attorney, Agent, or Firm* — Mei & Mark LLP

(57) ABSTRACT

A power transfer unit for a motive device comprises an outer housing, an inner housing, and a torque transferring clutch. A piston housing is located between the outer housing and the torque transferring clutch. A piston is located in the piston housing. The piston is configured to provide actuation forces to the torque transferring clutch. And, when the torque transferring clutch receives the actuation forces, the torque transferring clutch causes the inner housing to rotate.

20 Claims, 12 Drawing Sheets

IDLE-ABLE AUXILIARY DRIVE SYSTEM

CROSS-REFERENCE TO RELATED APPLICATION

This non-provisional patent application is a continuation-in-part of and claims priority to U.S. non-provisional patent application Ser. No. 12/629,424, filed Dec. 2, 2009, entitled Idle-Able Auxiliary Drive System, the disclosure of which is incorporated herein by reference. Application Ser. No. 12/629,424 is a non-provisional application of U.S. provisional application 61/122,861, filed Dec. 16, 2008. This application claims priority to and incorporates herein application 61/122,861.

TECHNICAL FIELD

The present disclosure relates generally to automotive vehicle drivelines that can convert between drive systems using two out of four wheels and all four wheels. More specifically, the present disclosure relates to the design and placement of a power transfer unit that assists with this conversion and that enables efficient packaging into a vehicle driveline.

BACKGROUND

Current all wheel drive (AWD) vehicle drivelines may comprise a primary front drive axle coupled to a secondary auxiliary rear drive system. The secondary auxiliary rear drive system typically includes a power transfer unit, a drive shaft, an AWD coupling device, a rear axle, and rear half shaft assemblies. When the vehicle is operating in a 4×2 mode, the front primary axle provides tractive forces to keep the vehicle moving, and to overcome the driveline efficiency losses of the secondary drive axle that is being driven through the tire/road surface interface. The driveline efficiency losses are largely due to oil churning losses, viscous drag, inertia, and friction.

To provide a more fuel efficient driveline for operating in 4×2 mode, it is desirable to have the ability to completely "idle" the secondary auxiliary drive system by disconnecting the secondary auxiliary drive system from the primary drive system and allowing the secondary auxiliary drive system to rotationally coast to a stop. Idling the secondary auxiliary drive system in this manner would remove virtually all of the driveline efficiency losses from the secondary auxiliary drive system with the exception of its non-rotating inertia.

SUMMARY

In one embodiment, a power transfer unit for a motive device comprises an outer housing, an inner housing, and a torque transferring clutch. A piston housing is located between the outer housing and the torque transferring clutch. A piston is located in the piston housing. The piston is configured to provide actuation forces to the torque transferring clutch. And, when the torque transferring clutch receives the actuation forces, the torque transferring clutch causes the inner housing to rotate.

In another embodiment, an oil port for actuating a piston comprises an inner tubular portion, the inner tubular portion comprising a first longitudinal extant narrower than a second longitudinal extent. An outer tubular surface comprises a lip area radially distanced from the second longitudinal extent, a first grooved area radially distanced from the first longitudinal extent, and a second grooved area radially distanced from the first longitudinal extent and at an end of the tubular surface opposite to the lip area. A piston housing comprises an oil port extension. The extension comprises a chamfer and an o-ring in the chamfer. The extension is positioned in the second longitudinal extent and the chamfer and the o-ring are radially in line with the lip area.

In another embodiment a coupling collar comprises an outer surface with radial spline extensions, a front surface, and a rear surface. The rear surface comprises a textured friction area configured to grip a wet-clutch friction surface, and at least one coupling area configured to interlock with a mating dog-clutch coupling area.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
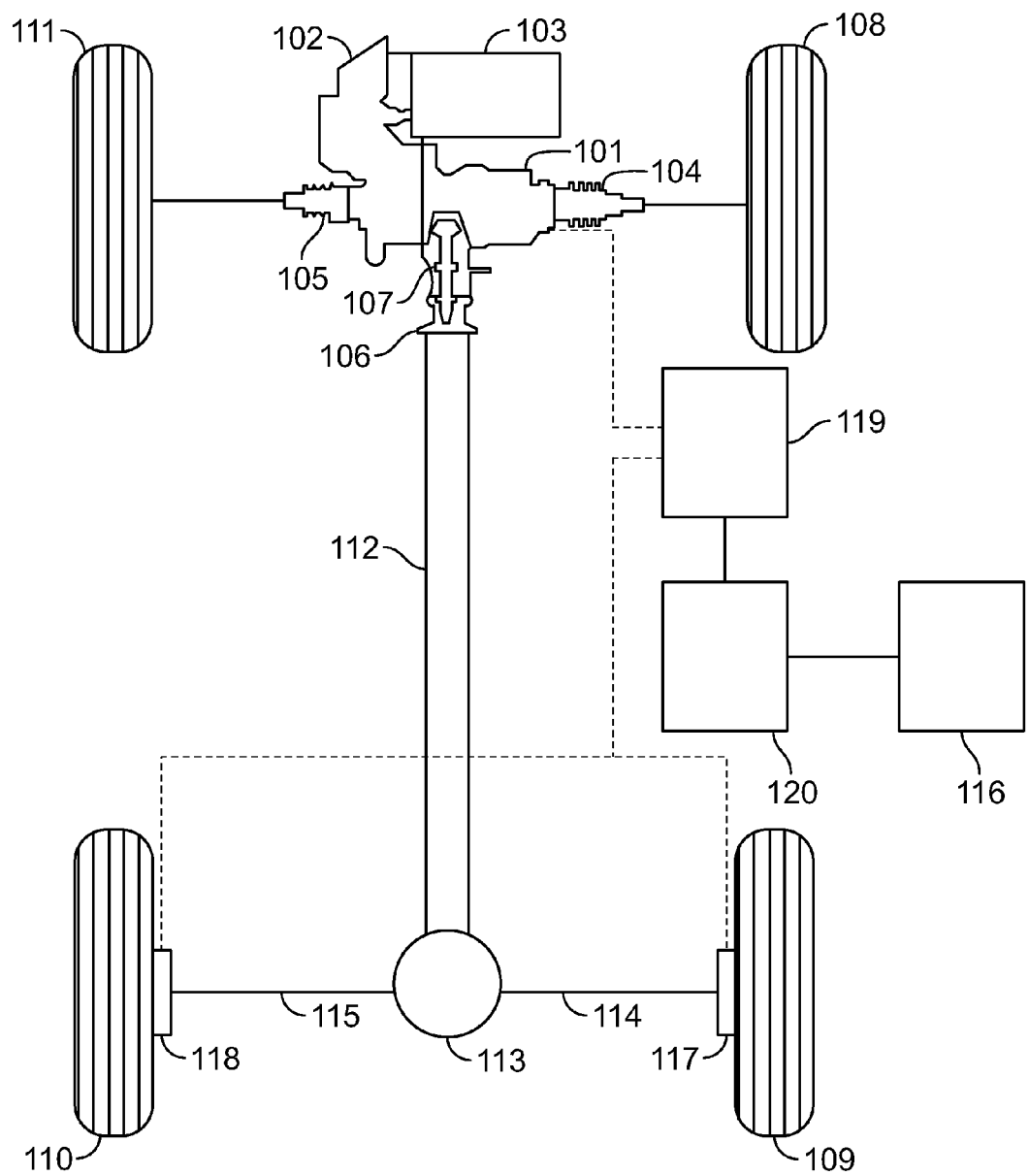
FIG. 1 is an example of a vehicle driveline having an idle-able PTU.

FIG. 1 shows one example of a front wheel drive vehicle driveline system for use in, for example, an automobile. The driveline comprises four wheels: first wheel 108, second wheel 109, third wheel 110, and fourth wheel 111. The front wheels, first wheel 108 and fourth wheel 111, provide tractive forces for 4×2 mode, which is a mode where rear wheels, second wheel 109 and third wheel 110, do not receive torque from the engine. In 4×4 mode, front and rear wheels receive torque from the engine to provide tractive forces for the vehicle.

Wheels 111 and 108 are part of a front axle, which comprises first and second constant velocity joint and output half shaft assemblies 104 and 105, primary drive front transaxle 102, and idle-able power transfer unit (PTU) 101. Primary drive front transaxle 102 is in mechanical communication with engine 103 and PTU 101, which may be bolted to the transaxle 102. PTU 101 is in mechanical communication with pinion gear 107, which is coupled via companion flange 106 to drive shaft 112. Drive shaft 112 is further coupled to rear drive axle 113, which is connected to first rear half shaft 114 and second rear half shaft 115. First rear half shaft 114 is coupled to first wheel hub disconnect 117, which is connected to second wheel 109. Second rear half shaft 115 is coupled to second wheel hub disconnect 118, which is coupled to third wheel 110.

The primary drive system of the vehicle may comprise engine 103, primary drive front transaxle 102, first and second constant velocity joint and output half shaft assemblies 104 and 105, output half shaft 204, and portions of PTU 101. The secondary auxiliary drive system may comprise other portions PTU 101, pinion gear 107, companion flange 106, drive shaft 112, rear drive axle 113, first rear half shaft 114, second rear half shaft 115, first wheel hub disconnect 117, and second wheel hub disconnect 118. The secondary auxiliary drive system can completely and non-rotationally idle while the vehicle is operating in a 4×2 mode and then re-engage with the primary drive system for operation in a 4×4 mode across all operating speeds, including highway operating speeds.

By including PTU 101, reliance on an electronic control coupling, or ECC, in between the rear axle and the drive shaft can be eliminated. In combination, this eliminates power transfer and fuel economy losses caused by viscous drag in hypoid gears and differential housings. This also eliminates friction losses in several gears, bearings and seals. The ability to disconnect the rear driveline using PTU 101 allows the rear driveline to coast to a stop and re-activate as an "on demand" driveline.

Torque transfers from the engine to a transmission within the primary drive front transaxle 102 and then to a front drive differential case. The front drive differential case can divide torque between a front driving differential gear set and PTU 101. The two front half shafts transfer torque to first wheel 108 and fourth wheel 111. PTU 101 transfers torque, through features described below, to drive shaft 112 then rear drive axle 113, where it is divided between first rear half shaft 114 and second rear half shaft 115. Appropriate amounts of torque are transferred to second wheel 109 and third wheel 110 through, respectively, first wheel hub disconnect 117 and second wheel hub disconnect 118.

An electronic control unit ("ECU") 120 processes data from sensors 116, which are connected to various locations along the driveline to determine the appropriate distribution of torque to each of the vehicle wheels. The amount of torque may be the same for each of first wheel 108, second wheel 109, third wheel 110, and fourth wheel 111, or the amount of torque to each wheel may vary individually in response to fraction, stability, braking, steering angle, driveline speed, acceleration, yaw, throttle position, or other vehicle conditions.

Various sensors and communications 116 provide data for processing within an electronic control unit ("ECU") 120. ECU 120 can determine appropriate amounts of torque for transfer to second wheel 109 and third wheel 110. In addition, ECU 120 can control when first wheel hub disconnect 117 and second wheel hub disconnect 118 should connect or disconnect second wheel 109 and third wheel 110 from respective first rear half shaft 114 and second rear half shaft 115. The connection and disconnection is facilitated by actuation from a hydraulic control unit ("HCU") 119, as will be further discussed below. HCU 119 also assists with actuation of a piston 211, as shown in FIG. 2, within PTU 101. ECU 120 may also determine when HCU 119 should actuate piston 211. A skilled artisan will recognize the arrangement of sensors and communications 116, the arrangement and operation of ECU 120, and the connection means to and from HCU 119.

Figure 2A:
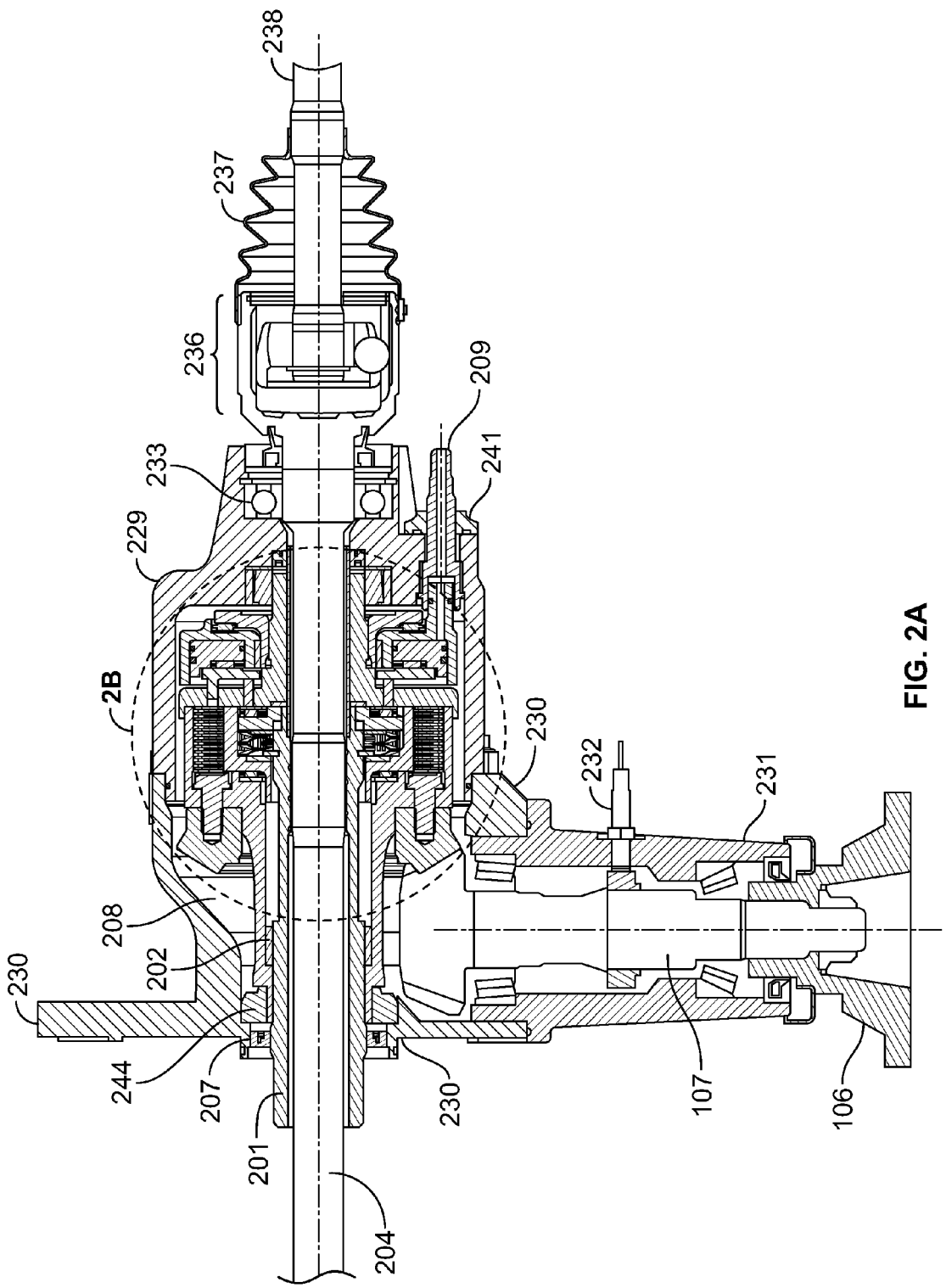
FIG. 2A is an example of a PTU with a non-rotating piston and non-rotating piston housing.
Figure 2B:
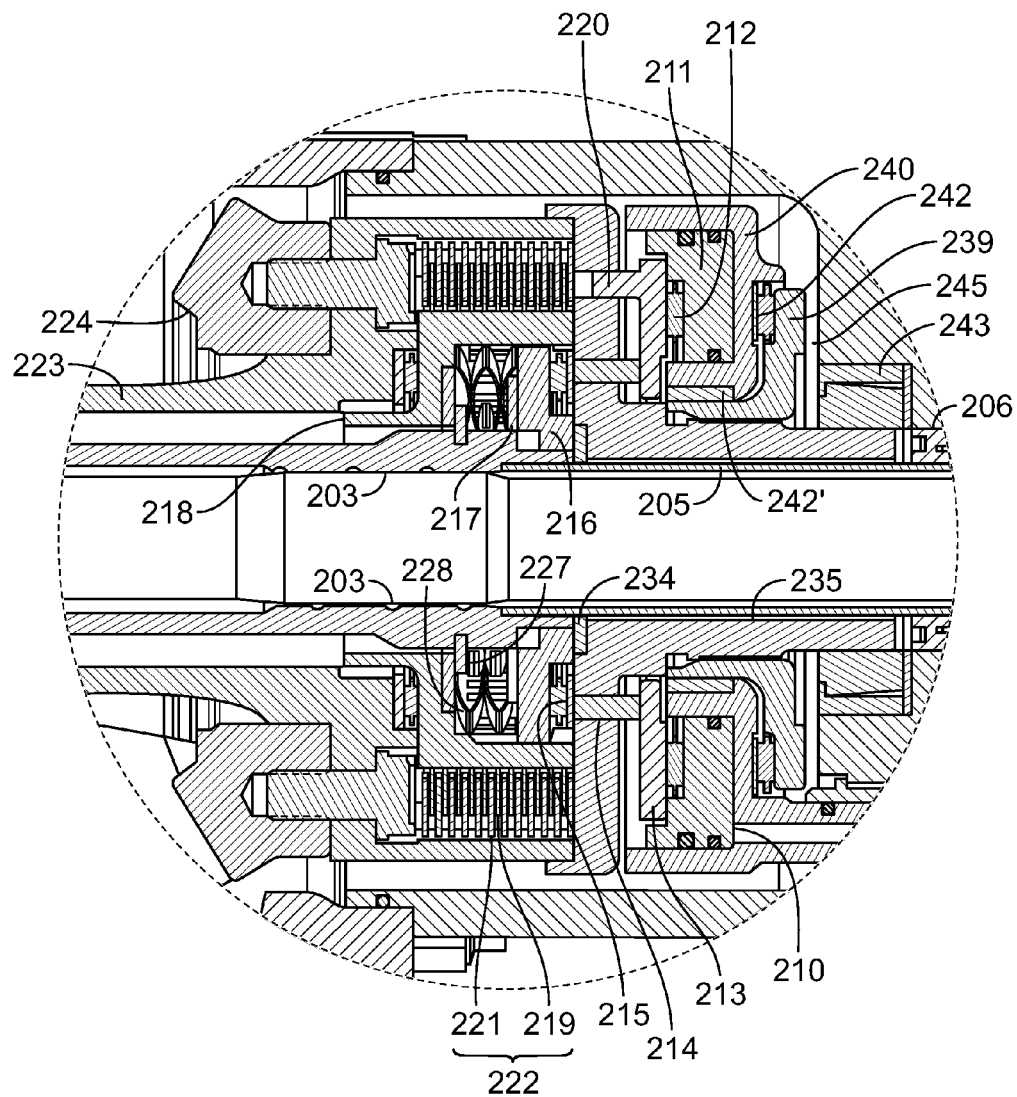
FIG. 2B is an enlarged view of a section of the PTU of FIG. 2A.
Figure 2C:
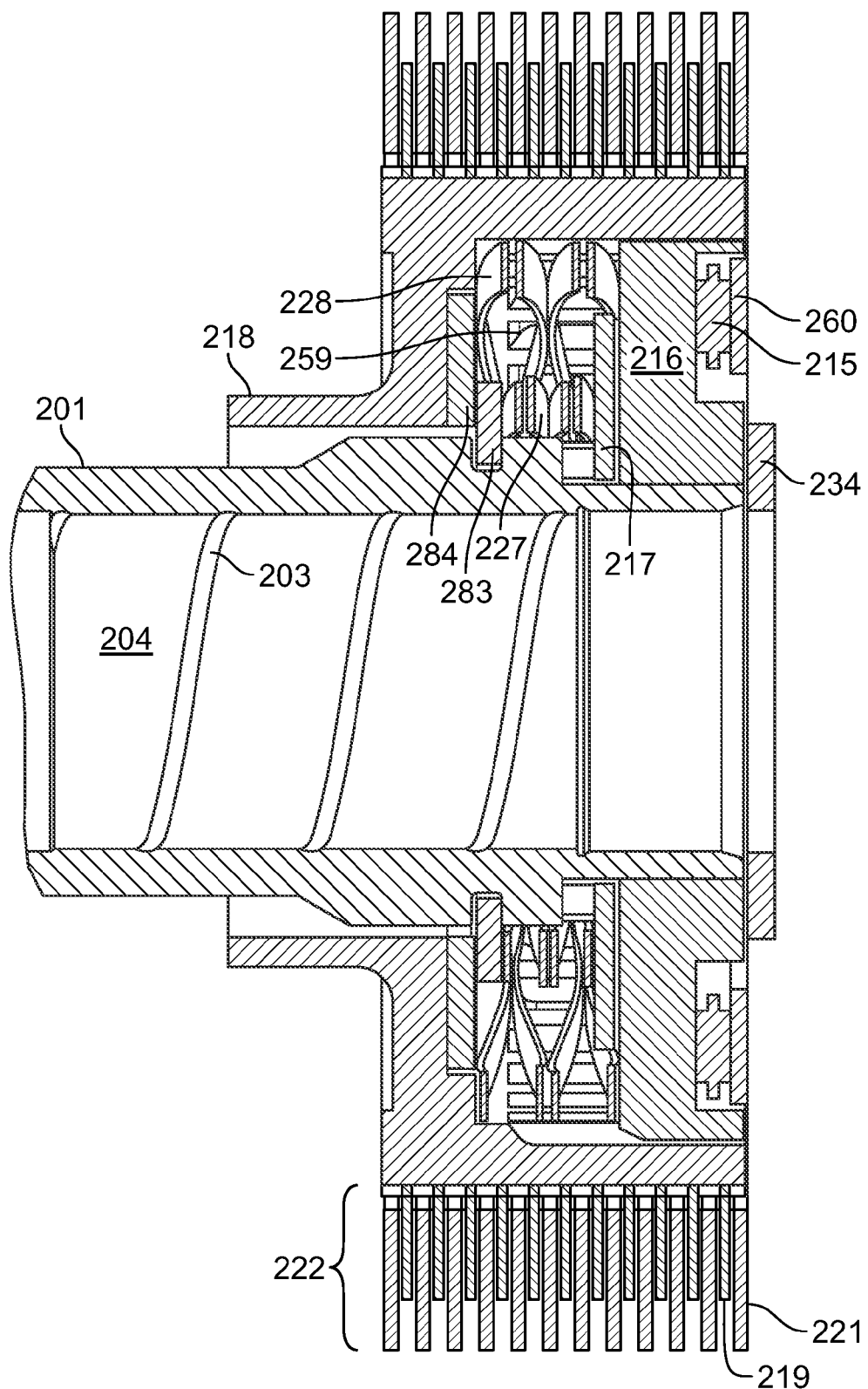
FIG. 2C is an alternative enlarged view of a section of the PTU of FIG. 2A.

FIGS. 2A, 2B, and 2C show one embodiment of an idle-able PTU. FIG. 2A is an enlargement of PTU 101 of FIG. 1, and FIG. 2B is an enlargement of a section of the PTU of FIG. 2A. FIG. 2C is an alternative example of the PTU of FIG. 1.

PTU 101 includes a torque transferring clutch in series with actuation members. In the embodiment shown, the torque transferring clutch is a wet clutch in series with a synchronized dog clutch. The torque transferring clutch may comprise a coupling member 218, inner friction discs 219, and outer friction discs 221. The torque transferring clutch may comprise a multi-plate wet clutch pack 222. An additional friction disc 217 may interface with a dog collar 216. The dog collar 216 may comprise dog clutch features in combination with wet clutch features. Actuation members may comprise, for example, slave piston 213, inner pins 214, outer pins 220, and second needle thrust bearing 215.

PTU 101 includes a housing that may comprise PTU outer housing cap 229 and PTU outer housing 230. PTU outer housing cap 229 also houses PTU oil volume area 208 and interfaces with roller bearing assembly 233. PTU outer housing 230 interfaces with PTU pinion housing 231. PTU pinion housing 231 houses pinion gear 107 and interfaces with at least one speed sensor 232.

As discussed above, torque is divided between the front driving differential (not shown) and PTU 101. PTU 101 receives torque via a hollow shaft 201 that is in direct connection between the front driving differential case and the input of a disconnectable hydraulically actuated multi-plate clutch in clutch pack 222. The clutch pack 222 is an example of a wet clutch, which is a lubricated clutch that can be selectively compressed to cause the plates to grip one another. The amount of grip engagement, or stiffness, of the plates correlates to the amount of torque transferred by the plates. The stiffness of the multi-plate clutch limits the amount of torque that can be transferred through a right angle gear set, comprising pinion gear 107 and ring gear 224. The right angle gear set drives drive shaft 112.

When operating in a 4×2 vehicle mode, torque is supplied to hollow shaft 201 directly from the front axle differential case. Hollow shaft 201 is radially supported via needle roller bearing 202 and also at a journal bearing fit at location 203 on output half shaft 204. The hollow output half shaft 204 spins freely, not transferring torque to any other portion of PTU 101. The space between output half shaft 204 and tube feature 205 forms a volume where lubricating oil from the transaxle freely flows. Tube feature 205, roller bearing assembly 233, first lip seal 206, and second lip seal 207, respectively, form an oil tight volume which keeps the oil from the transaxle (not shown) from mixing with the gear oil contained within PTU oil volume area 208. Output half shaft 204 connects, through roller bearing assembly 233, to constant velocity joint assembly 236 and constant velocity joint boot 237, which in turn interfaces with right hand outer output half shaft 238.

To shift the vehicle from a 4×2 mode to a 4×4 mode of operation, hydraulic control unit 119 supplies hydraulic fluid to oil port 209, which is secured to PTU outer housing cap 229 by sealing nut 241. An oil sump 245 is also formed in housing cap 229. The hydraulic fluid flows into piston chamber 210 in piston housing 240, where hydraulic pressure builds. Piston housing 240 pilots on the torque transferring clutch, but does not rotate. The pressure forces piston 211 to move axially, which creates thrust and moves first needle thrust bearing 212 and its thrust washer and slave piston 213. The axial movement in turn forces a plurality of inner pins 214 to engage a second needle thrust bearing 215 and its thrust washer 260. The second needle thrust bearing 215 and thrust washer 260 move axially to urge dog collar 216 to contact a first friction disc 217. Friction disc 217 is shown as a single plate, but may be a multi-plate wet clutch arrangement. Dog collar 216 may also have a friction surface facing the multi-plate wet clutch for engagement therewith.

Additional pressure supplied by hydraulic control unit 119 into piston housing 240 moves the dog collar 216 and friction disc 217 into contact with splined friction disc 283. Splined friction disc 283 rotates with hollow shaft 201, but does not engage snap ring 284 or friction disc 217 until sufficient pressure is placed on the piston 210, dog collar 216, and friction disc 217. Increasing pressure causes friction to increase between non-rotating dog collar 216, friction disc 217, and splined friction disc 283, thereby causing the parts to grip one another. The dog collar 216 thereby begins rotating.

Coupling member 218 and inner friction discs 219 rotate with dog collar 216 through rotative spline engagement between dog collar 216 and coupling member 218, and between coupling member 218 and inner friction discs 219 of clutch pack 222.

As the rotating speed of dog collar 216, friction disc 217, and splined friction disc 283 synchronizes, so does the rotating speed of dog collar 216 and hollow shaft 201. The synchronization is facilitated through the rotative engagement of friction disc 217 with splined friction disc 283 on hollow shaft 201.

Further increases in hydraulic pressure moves dog collar 216 axially and into mechanical rotative engagement with hollow shaft 201. Mechanical engagement occurs by mating dog clutch features on the inner radial face of dog collar 216 with corresponding dog clutch features on the outer radial face of hollow shaft 201. The dog clutch features can include any number, size, or shape of standard mating features for dog clutches and may include protrusion to recess matings or protrusion to protrusion matings. In addition to, or as an alternative to, dog clutch feature mating between dog collar 216 and hollow shaft 201, dog clutch features on the inner radial face of dog collar 216 can mate with dog clutch features on an outer radial face of coupling member 218. After the dog collar 216 and the hollow shaft 201 engage, the hollow shaft 201, dog collar 216, coupling member 218, and inner clutch discs 219 rotate together and the remainder of PTU 101 remains in idled condition.

Additional fluid pressure into piston housing 240 completes the conversion from 4×2 mode to 4×4 mode. This additional fluid pressure in piston chamber 210 of piston housing 240 causes a plurality of outer pins 220, which are connected to slave piston 213, to contact the outer friction discs 221 of clutch pack 222.

With the additional fluid pressure increase, the axial force exerted by outer pins 220 on clutch pack 222 increases to gradually transfer torque over to the idled system. The outer friction discs 221 engage and rotate with the inner friction discs 219 so that clutch pack 222 is loaded axially, thereby transferring torque from coupling member 218 to flange half spool 223. The outer friction discs 221 may be splined to the flange half spool 223 to complete the torque transfer, or, the outer friction discs 221 may compress to engage a friction plate that abuts either a surface of the flange half spool 223 or a coupling bolt in the flange half spool 223. Torque applied to flange half spool 223 applies torque to ring gear 224, which in turn supplies torque to pinion gear 107. Pinion gear 107 may be splined to companion flange 106, which is in turn bolted to the drive shaft 112.

Outer pin 220 is shown in FIG. 2A as integral with slave piston 213, but outer pin 220 can be separate from slave piston 213. Inner pin 214 is shown separate from outer pin 220/slave piston 213 combination, but inner pin 214 may be integral with the combination.

Synchronization across clutch pack 222 occurs progressively to transfer torque from hollow shaft 201 to drive shaft 112, rear drive axle 113, first rear half shaft 114, and second rear half shaft 115. The rotational speed of outer friction discs 221, coupling member 218, and flange half spool 223 increases until the rotational speed is synchronized with inner friction discs 219. Through this synchronization, outer friction discs 221, coupling member 218, flange half spool 223, and inner friction discs 219 are also synchronized with hollow shaft 201.

When the synchronization of inner friction discs 219 and outer friction discs 221 is within predefined limits, the rotational speed difference between the rear vehicle drive wheels, second wheel 109 and third wheel 110, and first rear half shaft 114 and second rear half shaft 115 also synchronize within predefined limits. Torque transfers from the primary drive system to the secondary drive system and is controlled by the number of and extent of engagement of inner friction discs 219 and outer friction discs 221.

Figure 4:
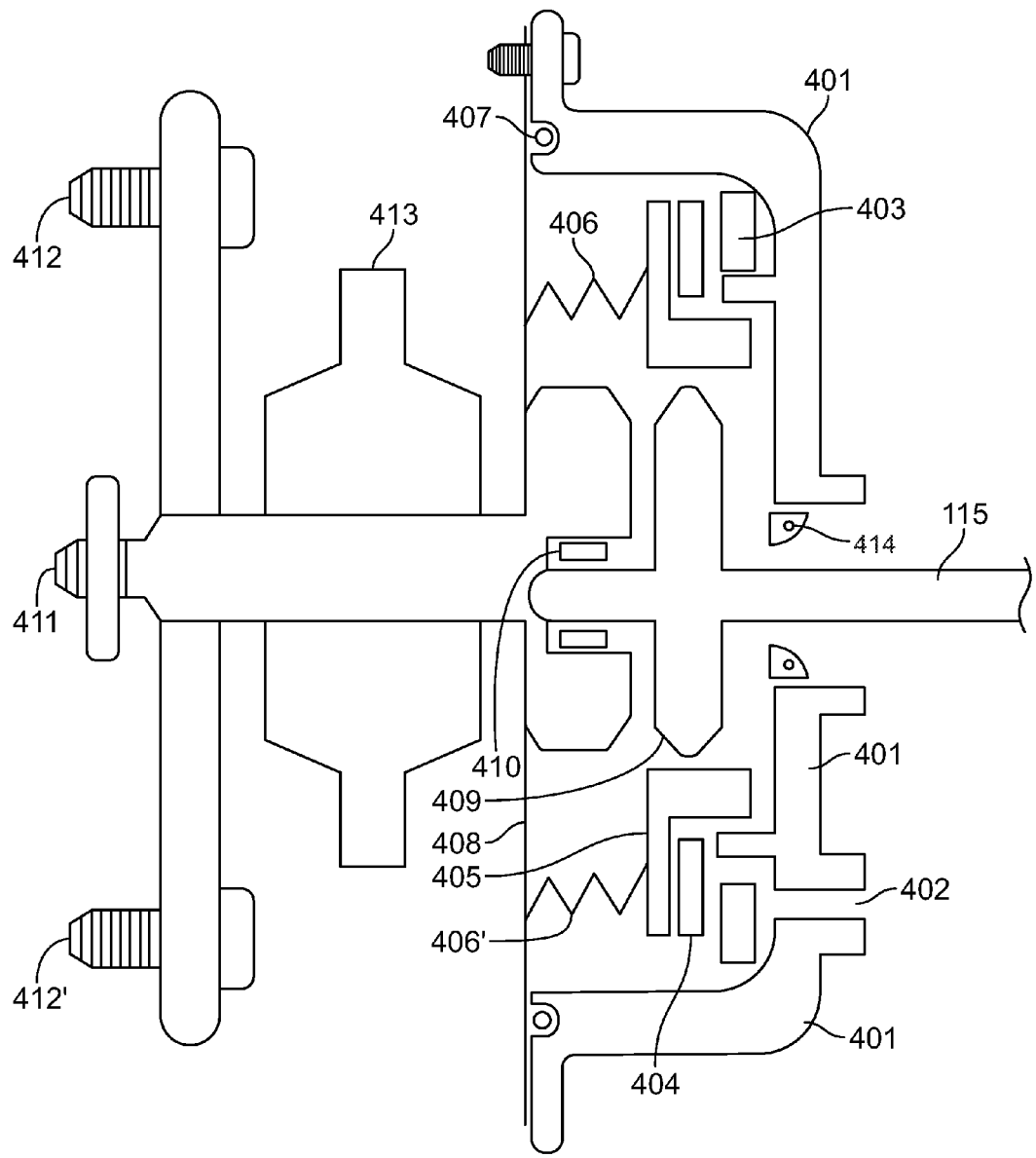
FIG. 4 is an example of a wheel hub disconnect.

With the primary drive system substantially rotationally synchronized with the secondary drive system, the rear wheels are connected to the secondary drive system. As illustrated in FIG. 4, hydraulic control unit 119 supplies hydraulic fluid to a volume bounded by seal 414 and 407 via a wheel hub hydraulic fluid input 402 for actuation of a wheel hub piston 403 at second wheel hub disconnect 118. A bearing 404 is between piston 403 and wheel hub dog collar 405. Wheel hub piston 403 causes a dog clutch arrangement at dog clutch features 409 to engage. The dog clutch features are present on wheel hub dog collar 405, output stub shaft 411, and second rear half shaft 115. A similar operation occurs at first wheel hub disconnect 117 to enable the secondary auxiliary drive system to engage both rear wheels.

Second wheel 109 and third wheel 110 convert from being driven by tire/road friction to being driven by the driveline in a 4×4 configuration. The magnitude of drive torque transferred through the secondary auxiliary drive system may be controlled by the torque transfer at clutch pack 222.

When shifting the vehicle from a 4×4 mode to a 4×2 mode of operation, and to completely idle the secondary auxiliary drive system during 4×2 mode operation, hydraulic control unit 119 reduces hydraulic pressure within piston chamber 210 to a predefined level. This allows the combined axial force of first and second bias springs 227 and 228 and clutch pack (222) compliance to create sufficient thrust to push outer pins 220 out of contact with the closest outer friction disc 221. The clutch pack compliance is a spring-like force caused by the tendency of inner friction discs 219 and outer friction discs 221 to spread apart. Ideally, both bias springs 227 and 228 unload to transfer thrust and prevent any drag. However, in some embodiments, bias springs 227 and 228 may remain slightly compressed.

The thrust transfer disengages the discs of clutch pack 222, which reduces the torque transfer through clutch pack 222 to a minimum. First bias spring 227 and second bias spring 228 axially push on inner pins 214 via dog collar 216. The pushing moves dog collar 216 out of mechanical rotational engagement with hollow shaft 201. First bias spring 227 and second bias spring 228 continue to move dog collar 216 axially until friction disc 217 is also out of contact with dog collar 216. The splined friction disc 283 also disengages its friction grip with friction disc 217. This disconnects a front portion of the auxiliary drive system from the primary drive system.

The thrust from bias springs 227 and 228, combined with clutch pack 222 compliance, also transfers through piston 211, which pushes axially on piston housing 240. Thrust then transfers to needle roller bearing 242. Needle roller bearing 242 is comprised of a plurality of rollers which pilot in place between piston housing 240 and thrust bearing 239. Radial needle bearing 242' also comprises a plurality of rollers, which receive radial loading and radially support piston housing 240 on thrust bearing 239. Needle roller bearing 242 receives and reacts to thrust loads from piston 211. The thrust loads are transferred in to thrust bearing collar 239, which is threaded on to cap half spool 235 which abuts shim 234. Shim 234 braces the motion of hollow shaft 201. Thrust bearing 239 and cap half spool 235 rotate together. Axial thrust from piston 211, clutch pack compliance, and bias springs 227 and 228 is contained between cap half spool 235 and flange half side spool taper roller bearing 244, with the majority of the axial thrust remaining within the torque transferring clutch. Optimally, no axial thrust is transferred to flange half side spool taper roller bearing 244. Axial thrust transfer to cap half side spool taper roller bearing 243 is eliminated. Any thrust forces received at cap half side spool taper roller bearing 243 are from the gear set at pinion gear 107.

The thrust loading of the needle roller bearing 242 and piston housing 240 can create an axial force, which can react back to the disc case of clutch pack 222. The reaction force caused by the thrust loading remains in the torque transferring clutch.

This departs from the conventional drive system, which does not include needle roller bearings or a piston housing. In order to accommodate thrust loads from the torque transferring clutch, the conventional drive system would require stronger, larger and more costly taper roller bearings for an output half shaft and a flange half side spool. This would increase the packaging of the conventional drive system.

The embodiment of FIGS. 2A, 2B, and 2C allows for a smaller and less costly cap half side spool taper roller bearing 243 and flange half side spool taper roller bearing 244. The use of piston housing 240 also improves the packaging of PTU 101 by reducing a housing size requirement for the accommodation of taper roller bearings. The reduced housing size requirement allows pinion gear 107 to be mounted closer axially to the interface between pinion gear 107 and primary drive front transaxle 102. This design allows for additional improvements to packaging capabilities on vehicle drivelines.

The use of non-rotating piston housing 240 also moves the piston 211 location inboard from cap half side spool taper roller bearing 243, thereby allowing the use of a larger outer diameter sized cap half side spool taper roller bearing 243. This arrangement reduces the overall axial package of PTU 101 and improves the packaging of PTU 101 into vehicle platforms.

Moving the location of non-rotating piston housing 240 inboard from a cap half side spool taper roller bearing 243 has an additional benefit, because the change in location may accommodate a larger inner diameter sized cap half side spool taper roller bearing 243.

The radial design freedom on the inner and outer diameters of the cap half side spool taper roller bearing 243 benefits both a sealing tube feature 205 and the output half shaft 204. The sealing tube feature 205 and the output half shaft 204 can have enhanced sectional modulus to handle additional torque and fatigue, when compared to the conventional drive system. The enhancements benefit the longevity of both the idle-able auxiliary drive system and the primary drive system of a vehicle.

Also, when shifting from 4×4 mode to 4×2 mode, the auxiliary drive system fully disconnects from both rear drive wheels, second wheel 109 and third wheel 110 when HCU 119 reduces hydraulic pressure to wheel hub piston 403. The rear drive wheels are disconnected after the multiplate clutch pack 222 is unloaded to reduce torque going to the secondary auxiliary drive system and the synchronized dog clutch at dog collar 216 is disengaged. After the rear wheels are disconnected at first and second wheel hub disconnects 117 and 118, hydraulic pressure in piston housing 240 is reduced to facilitate the disconnection of the PTU from hollow shaft 201.

Speed sensor 232 and an optional tone wheel feed speed information to observers 310 and controllers 314 as part of sensors 301. The information assists with a determination of drive line speed, which enables ECU system to determine when to engage and when to disengage the auxiliary drive system. For example, ECU system can compare the vehicle speed as measured at the front axle to the driveline speed or driveshaft speed to determine the optimal time to engage the auxiliary drive portion of the PTU, or to determine when the auxiliary drive system is synchronized with the primary drive system.

FIG. 2C shows an alternative embodiment of the PTU 101. In FIG. 2C, the friction disc 217 is splined to the hollow shaft 201, and the dog collar 216 is splined to coupling member 218. The friction disc 217 has a friction surface that faces a friction surface on the dog collar 216. When the dog collar is urged leftward, as seen in FIG. 2C, the facing friction surfaces engage to synchronize the hollow shaft 201, the friction disc 217, the dog collar 216, and the coupling member 218.

FIG. 4 shows an embodiment of second wheel hub disconnect 118 for disconnecting third wheel 110 from the auxiliary drive system. When PTU 101 transfers a minimum of torque onto the auxiliary driveline, the hydraulic pressure to the first wheel hub disconnect 117 and the second wheel hub disconnect 118 is reduced to a minimum level. A hydraulic fluid input 402 in wheel hub disconnect housing 401 is connected to HCU 119 to achieve the pressure reduction. Bias springs 406 and 406' located between knuckle 408 and wheel hub dog collar 405 cause dog clutch features 409 on each of an output stub shaft 411, second rear half shaft 115, and wheel hub dog collar 405 to disengage. This disconnects the rotational connection between the second rear half-shaft 115 and third wheel 110, which is attached via wheel lugs 412 and 412' to output stub shaft 411 and needle bearing 410, output stub shaft 411 being surrounded by wheel hub bearing 413. A similar operation also occurs on first rear half-shaft 114.

With the secondary auxiliary drive system fully disconnected from the primary drive system of the vehicle, and the rear wheels fully disconnected from the secondary auxiliary drive system, the secondary auxiliary drive system coasts to a non-rotational stop. The secondary auxiliary drive system is then in an idled condition, and the fuel economy of the driveline increases.

Figure 3:
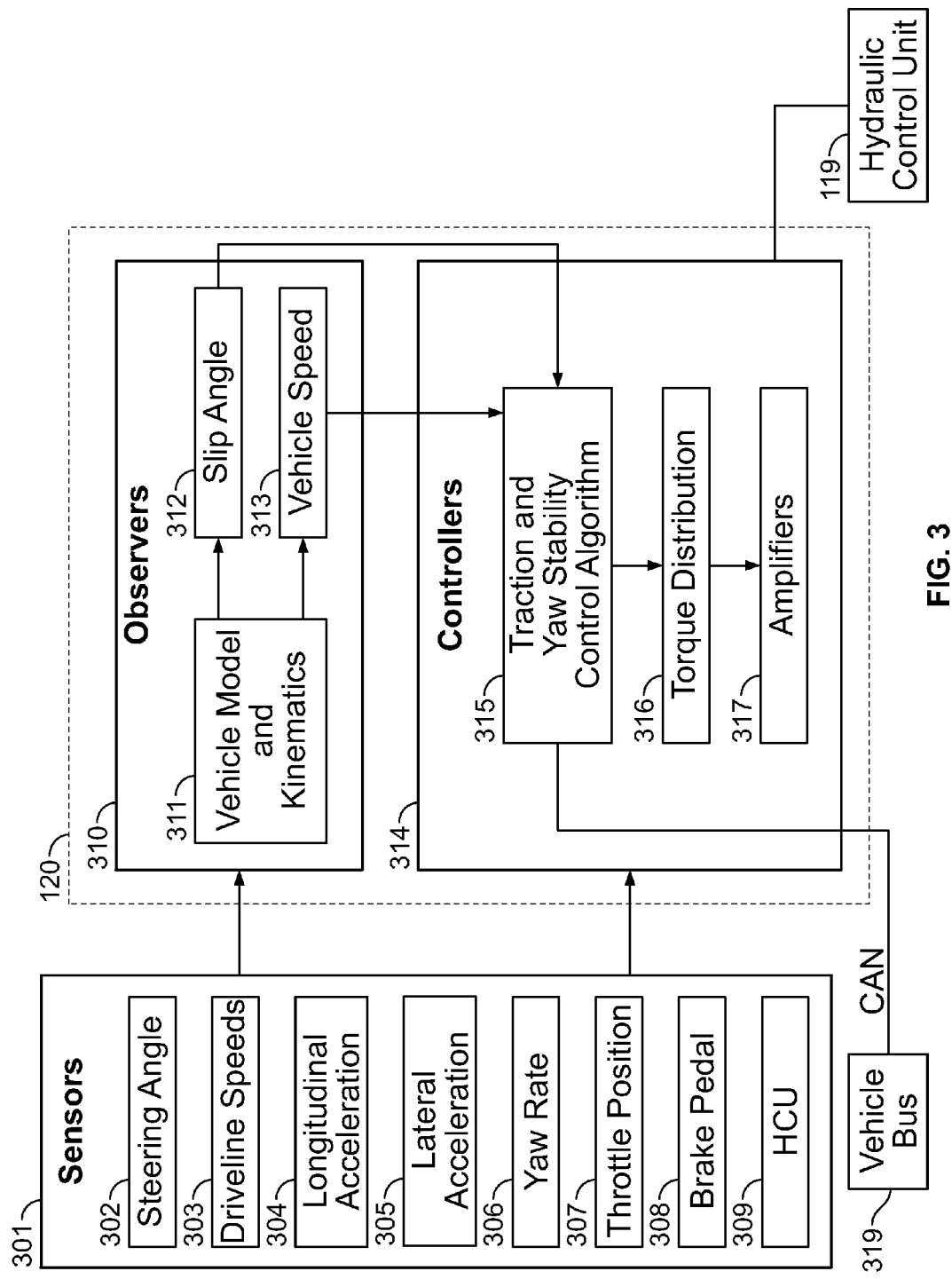
FIG. 3 is an example of an electronic control unit (ECU).

FIG. 3 shows an exemplary schematic for an electronic control unit (ECU) system. The ECU system comprises sensors 301, ECU 120, HCU 119, and vehicle bus 319 with associated controller area network (CAN). Sensors 301 collect data for use in observers 310 and controller 314 of ECU 120. The sensors may comprise one or more of a steering angle sensor 302, driveline speed sensor 303, longitudinal acceleration sensor 304, lateral acceleration sensor 305, yaw rate sensor 306, throttle position sensor 307, brake pedal sensor 308, and hydraulic control unit sensor 309. The sensors shown in FIG. 3 are exemplary only, and the idle-able auxiliary drive system can operate with additional sensors in the system and may also operate with fewer sensors than those shown, as will be understood by one skilled in the art. For example, additional sensors may be associated with vehicle bus 319 and may be dedicated or undedicated to sending data to ECU 120. The additional sensor data can be supplied to traction and yaw stability control algorithm controller 315. In an additional embodiment, additional sensor data from vehicle bus 319 can be distributed by CAN to vehicle model and kinematics observer 311 for additional processing.

The sensors 301 forward data to the ECU 120, which may comprise at least one processor with an associated memory and stored algorithms. The processor may be part of a computer system or on-board chip system. The processor of the ECU 120 may comprise one or more observers 310, which may comprise a vehicle model and kinematics observer 311. The vehicle model and kinematics observer 311 processes the data from sensors 301 according to programmed algorithms and creates data related to a slip angle 312 and vehicle speed 313. Additional data can also be created by vehicle model and kinematics observer 311, such as bank angle or roll angle data.

The slip angle 312 and vehicle speed 313 data is shared with controller 314, which also collects data from sensors 301. Controller 314 may be a part of the processor of the ECU 120 having observers 310, or controller 314 may be an additional processor with associated memory and stored algorithms which cooperate with the processor having observers 310. A traction and yaw stability control algorithm controller 315 is used to make determinations based upon at least one of the slip angle 312 data, vehicle speed 313 data, sensors 301 data, additional sensors, and additional data. Based on the results of the determinations made by the traction and yaw stability control algorithm controller 315, commands are sent from the controller via the bidirectional CAN to a vehicle bus 319 for implementation by various vehicle actuators at various locations along the vehicle drive train. The location and function of the vehicle actuators are not shown, but are within the knowledge of one of ordinary skill in the art. The commands from the controller relate to various electronically controlled stability features associated with the vehicle, including but not limited to traction control, anti-lock braking, oversteering control, limited slip differential control, and rollover control.

Results from traction and yaw stability control algorithm controller 315 are also forwarded to torque distribution controller 316 and amplifiers 317. Torque distribution controller 316 helps determine how much torque to transfer from the primary drive system to the secondary auxiliary drive system. Commands from torque distribution controller 316 are forwarded to amplifiers 317 for creation of actuation currents for transmission to HUC 119. HCU 119 interfaces with the vehicle system to provide hydraulic fluid pressure control as commanded, as described in more detail below.

The combination of sensors 301, ECU 120, and HCU 119 allows synchronization of moving parts along the drive train. When hydraulic pressure is increased in PTU 101, it urges dog collar 216 to engage between hollow shaft 201 and an input spline collar on clutch pack 222, causing only a clutch spline collar and inner friction discs 219 to rotate at the same speed as the front driving differential. The pressure within PTU 101 can be further increased, causing torque to begin being transferred through multi-plate wet clutch pack 222 in a controlled manner. This results in increasing rotational speed of the secondary auxiliary drive system until its speed matches, or synchronizes, with that of the front drive differential. The ECU system of FIG. 3 assists with the matching or synchronization.

The ECU system further assists with the synchronous operation of the wheel hub disconnects so that torque is transferred smoothly from the front drive differential, through clutch pack 222, to each rear wheel. The ECU system can determine the extent and timing of mechanical engagement of the various disclosed coupling members of the drive train. The ECU system also assists with the extent and timing of disengagement of the various disclosed coupling members of the drive train for idling of the secondary auxiliary drive system.

Figure 5:
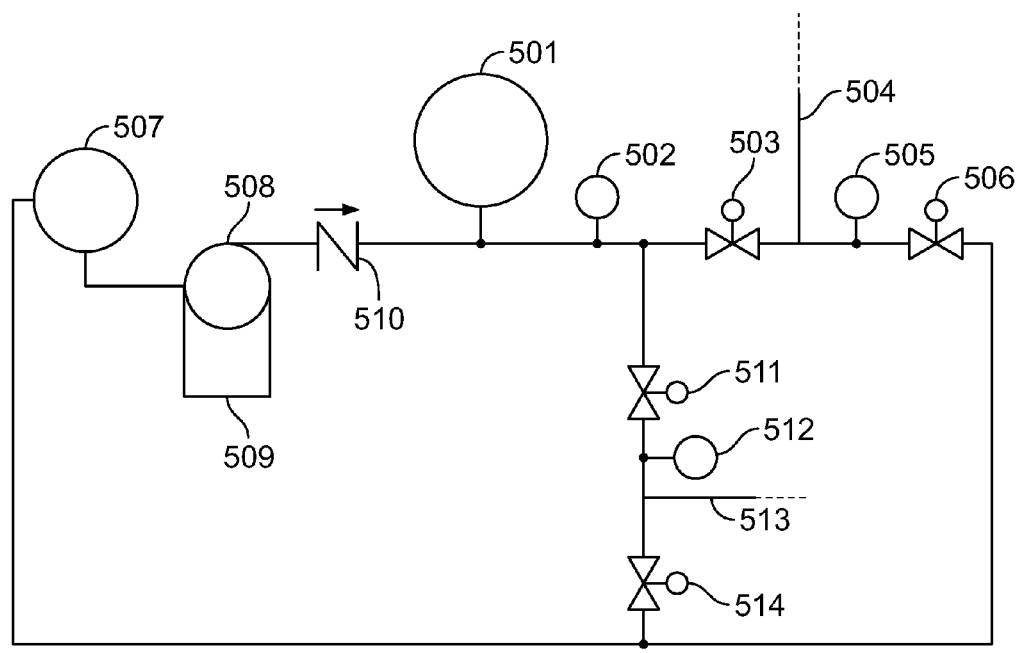
FIG. 5 is a schematic of an exemplary hydraulic control unit (HCU).

FIG. 5 shows an example of a hydraulic control unit architecture that may be used with the disclosed idle-able auxiliary drive system. The architecture includes several pressure regulating valves ("PRV"). Hydraulic fluid accumulates in an accumulator 501 and passes a first pressure sensor 502. Fluid then interfaces with first normally shut PRV 503. When fluid pressure is desired in piston chamber 210, first normally shut PRV 503 opens while first normally open PRV 506 shuts to supply fluid at oil port 209 of PTU 101. Fluid is then supplied to power transfer unit supply line 504, which interfaces with oil port 209.

When pressure is no longer needed at piston chamber 210, or a desired amount of pressure has been achieved, first normally shut PRV 503 returns to a shut position. A second pressure sensor 505 lies between PTU supply line 504 and first normally open PRV 506 and senses pressure between first normally shut PRV 503 and first normally open PRV 506. First normally open PRV 506 closes when a pressure increase is needed to actuate piston 211 and re-opens when hydraulic pressure on piston 211 is no longer needed. First normally shut PRV 503 and first normally open PRV 506 can be selectively opened and closed to obtain a desired pressure in non-rotative piston housing 210 of PTU 101. The open and shut conditions can be selected by controllers 314 of ECU 120.

Hydraulic fluid from accumulator 501 is also supplied to second normally shut PRV 511. When increased fluid pressure is desired at first wheel hub disconnect 117 and second wheel hub disconnect 118, second normally shut PRV 511 opens while second normally open PRV 514 shuts. Fluid then passes through third pressure sensor 512 and is supplied to wheel hub disconnect supply line 513 to further distribute to first wheel hub disconnect 117 and second wheel hub disconnect 118. Wheel hub disconnect supply line 513 interfaces with a hydraulic fluid input port 402 of each of the wheel hub disconnects. Second normally open PRV 514 may shut to build fluid pressure at first wheel hub disconnect 117 and second wheel hub disconnect 118. The open and shut conditions of second normally open PRV 514 and second normally shut PRV 511 may be selected by controllers 314 of ECU 120 to control the actuation of respective wheel hub piston 403 of first and second wheel hub disconnects 117 and 118. First, second, and third pressure sensors 502, 505, and 512 may supply data to ECU 120 to assist with regulation of pressure supplied to piston 211 and wheel hub piston 403.

Once hydraulic fluid is used in PTU 101, first wheel hub disconnect 117, and second wheel hub disconnect 118, the fluid returns to sump 507 and is redistributed to the system through pump 508 with associated electric motor 509. Check valve 510 prevents backflow of fluid from accumulator 501 to pump 508.

Figure 6:
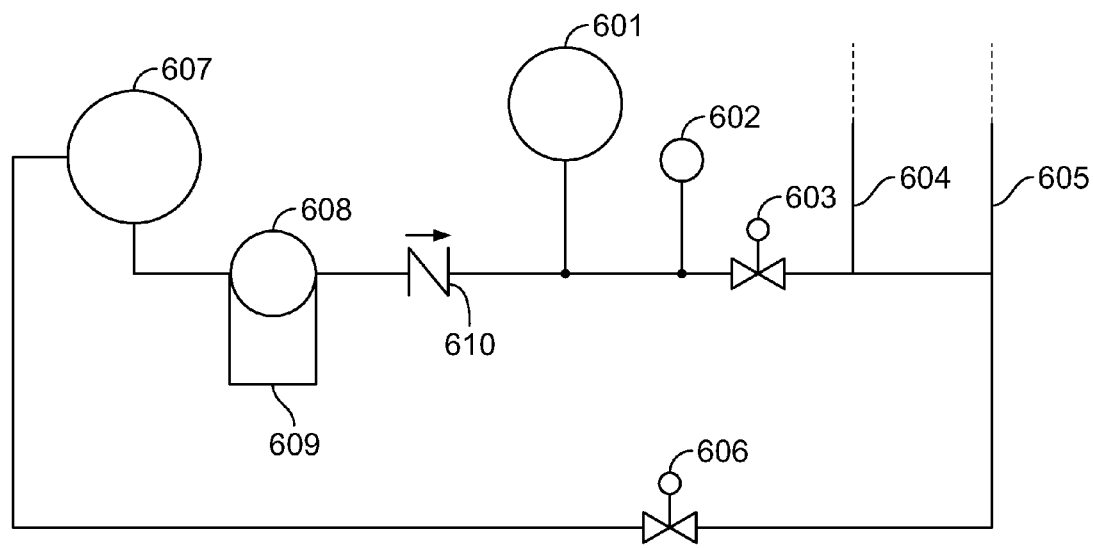
FIG. 6 is an alternative schematic of an exemplary HCU.

FIG. 6 shows a second example of a hydraulic control unit architecture. Hydraulic fluid accumulates in accumulator 601 and passes pressure sensor 602 before reaching normally shut PRV 603, which opens when fluid pressure is needed on supply line 604 to PTU 101 and supply line 605 to wheel hub disconnects 117 and 118. Normally open PRV 606 may shut when pressure is needed on supply line 604 to PTU 101 and supply line 605 to wheel hub disconnects 117 and 118. The open and shut conditions of normally open PRV 606 and normally shut PRV 603 may be selected by controllers 314 of ECU 120 in order to control the actuation of piston 211 and wheel hub piston 403 of a wheel hub disconnect. Pressure sensor 602 collects pressure data for processing by ECU 120 for controlling the pressure of hydraulic fluid to piston 211 and wheel hub piston 403.

After hydraulic fluid is used in PTU 101, first wheel hub disconnect 117, and second wheel hub disconnect 118, it returns to sump 607 and is redistributed to the system through pump 608 with associated electric motor 609. Check valve 610 prevents backflow of fluid from accumulator 601 to pump 608.

Figure 7A:
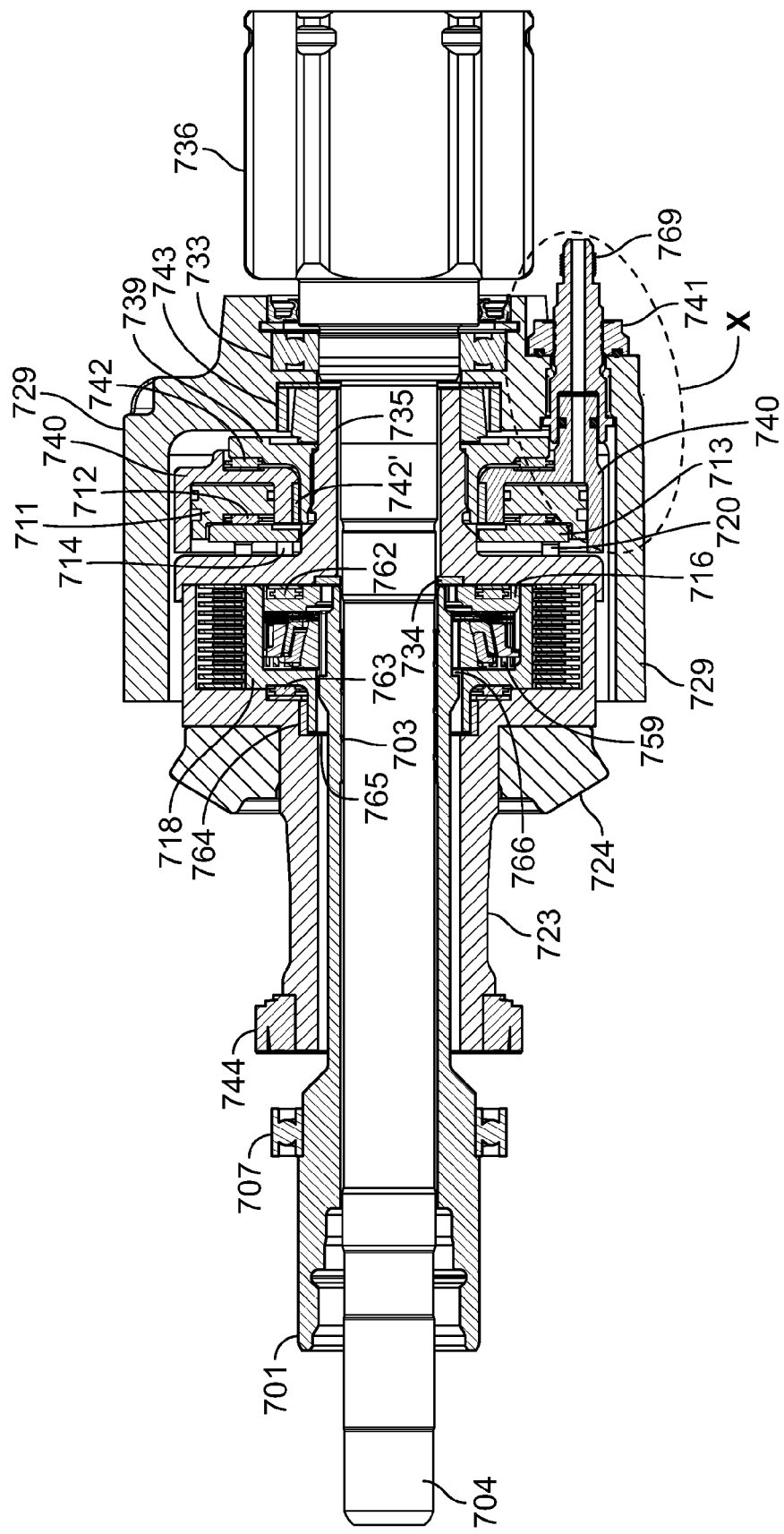
FIG. 7A is an alternative embodiment of a PTU with a piston and a non-rotating piston housing, the PTU having a cone clutch synchronizing assembly.

Turning now to FIGS. 7A-7F, an alternative arrangement for an idle-able power transfer unit is shown. The alternative embodiment provides similar synchronization functionality to a vehicle driveline through a modified torque coupling arrangement. FIG. 7A shows a portion of a PTU with a triple cone clutch. A portion of PTU outer housing 729 is shown encasing piston housing 740, cap half side spool taper roller bearing assembly 742, roller bearing assembly 733, and a portion of flange half spool 723. Right hand inner-output half shaft 704 with journal bearing 703 protrudes through the PTU and interfaces with constant velocity joint assembly 736. Hollow shaft 701 surrounds a portion of right hand inner-output half shaft 704. Lip seal 707 is intended to interpose hollow shaft 701 and a remaining portion of PTU outer housing.

An oil sump 744 surrounds a portion of flange half spool 723, which may surround a roller bearing above hollow shaft 701. Ring gear 724 interfaces around flange half spool 723. Cap half spool 735 abuts a portion of flange half spool 723. Together with shims 765 and 734, cap half spool 735, flange half spool 723, and a portion of hollow shaft 201 enclose clutch pack 722, bearings 762 and 763, thrust washers 760 and 761, needle roller bearing 764, coupling member 718, dog collar 716, coupling grooves 759, bias springs 727 and 728, and the cone clutch. Thrust washer 761, bearing 763, and needle roller bearing 764 can also be used in the embodiment of FIG. 2A, as they provide a means to cope with a speed differential when the larger, outer components are stationary, but the internal components are rotating.

Slave piston 713, along with inner and outer pins 714 and 720, interfaces against cap half spool 735. Piston housing 740 non-rotatingly journals on thrust bearing collar 739, supported by needle roller bearing assemblies 742 and 742'. Piston 711 abuts a needle thrust bearing 712 and receives hydraulic pressure through oil port features of oil port 709.

Figure 7B:
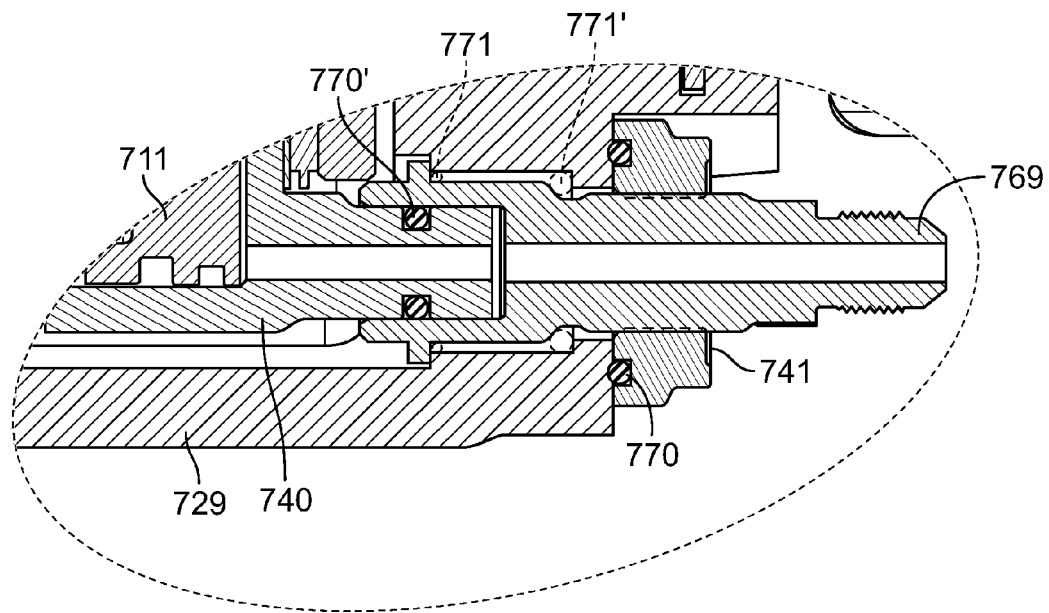
FIG. 7B is an enlarged view of oil port features of the PTU of FIG. 7A.

FIG. 7B shows an enlargement of area X in FIG. 7A. A portion of piston housing 740 has a tubular configuration that fits into tolerancing oil port 769. O-ring 770 assists with fluid retention. Tolerancing oil port 769 is held against PTU outer housing cap 729 by sealing nut 741, which has o-ring 770. Additional, alternative fluid sealing points 771 and 771' are provided by placing o-rings at chamfered locations on either or both of PTU outer housing cap 729 or tolerancing oil port 769. This floating connection-type oil port enables the use of a bulk-head type hydraulic connection in an axle, transaxle, or transfer case.

The arrangement of o-rings 770 and 770', and alternative o-rings 771 and 771', along with the features of tolerancing oil port 769, allows for very precise actuation of piston 711. Piston 711 is axially located very precisely with respect to a bearing bore providing hydraulic pressure. The precise location ensures smooth piston 711 actuation. However, the hole punched in the PTU outer housing 729 is not located as precisely as the piston 711 within piston housing 740. With the oil port arrangement of FIG. 7B, a through hole in PTU outer housing 729 can be made very large to make up for mis-match. The tolerancing oil port 769 can move radially to align with the tubular feature of piston housing 740 and with PTU outer housing 729. The combination of sealing nut 741 and tolerancing oil port 769 also enables compensation for slack. The oil port arrangement provides dual pressure sealing: it maintains PTU housing pressure by sealing carrier lubrication from seeping out through the hydraulic port; and it provides high pressure hydraulic actuation to piston 711.

Figure 7D:
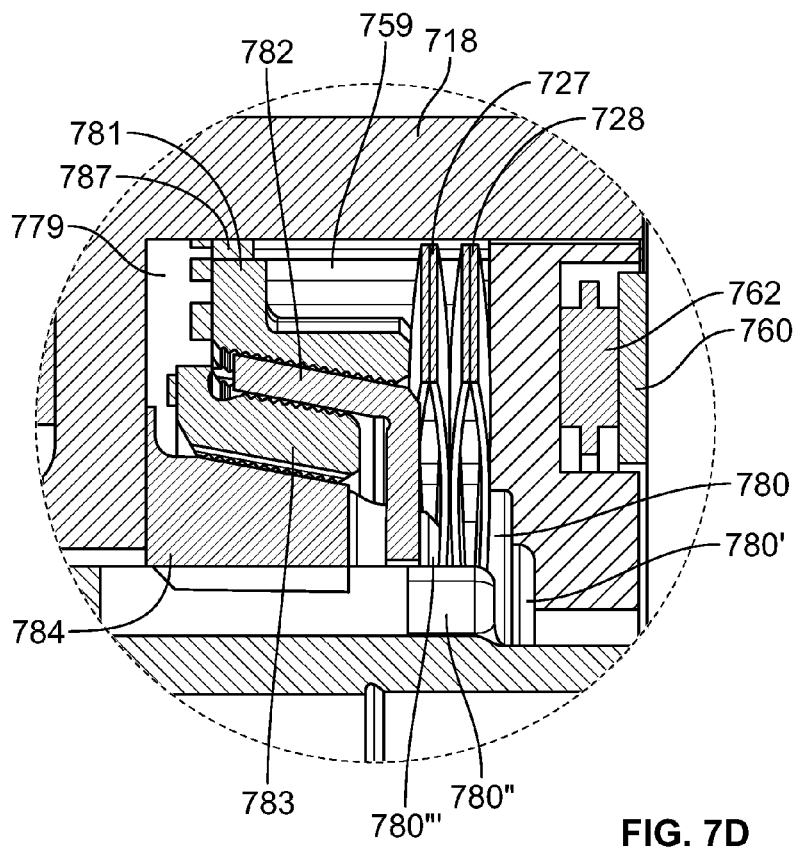
FIG. 7D is a further enlarged view of the synchronizing assembly of FIG. 7A.
Figure 7C:
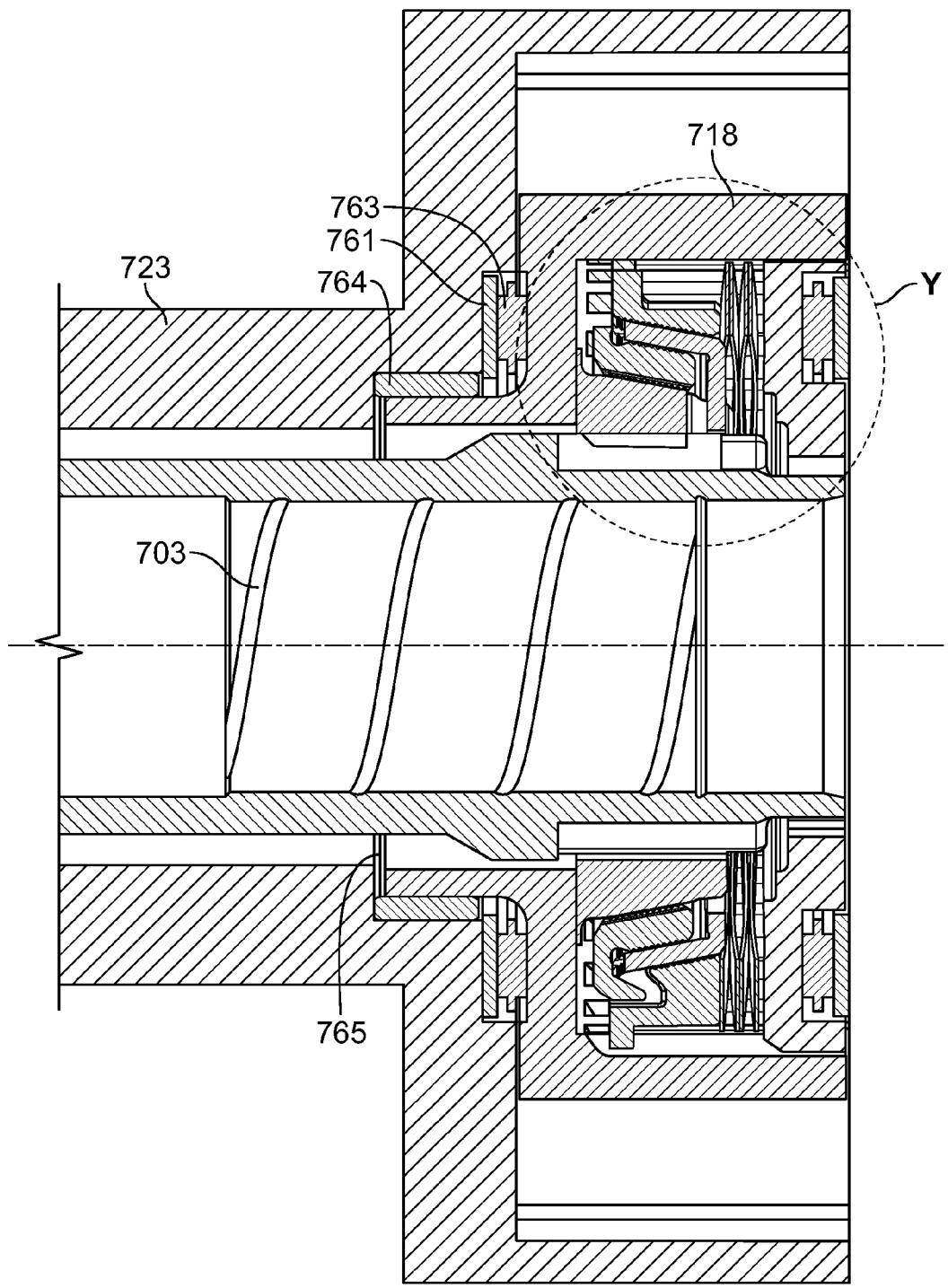
FIG. 7C is an enlarged view of the synchronizing assembly and coupling features of FIG. 7A.

FIG. 7C shows an enlargement of the area around the cone clutch, with some features omitted for clarity. However journal bearing 203 is also shown in greater detail. Area Y surrounds the dog collar 716 and the cone clutch, which is shown as a high inertial capacity triple cone clutch. The cone clutch may also be a single or double cone clutch, or other synchronization feature.

FIG. 7D is an enlargement of area Y. Thrust washer 760 abuts bearing 762, which abuts dog collar 716. Dog clutch features 780 and 780' on dog collar 716 are appropriately configured to interfit with dog clutch features 780" and 780'" on hollow shaft 701 and fourth cone 784, respectively. The dog collar 716 is splined to coupling member 718.

Bias springs 727 and 728 interpose dog collar 716 and cone clutch, but may alternatively interpose cone clutch and coupling member 718 in location 779. A spring such as a wave spring or bevel spring may be used for bias springs 727 and 728. A spring in alternative location 779 may provide additional separation force for the synchronizing cone clutch, which usually opens in an unpressurized state due to its own compliance. Bias springs 727 and 728 are designed to relax and unload to release torque between the dog collar 716 and the synchronizing cone clutch. Bias springs 727 and 728 also allow the dog collar 716 to travel inward when necessary and the springs compress to transfer pressure from the dog collar 716 to first cone 781.

First cone 781 has a plurality of coupling teeth 787 that fit in to coupling grooves 759 of coupling member 718 for splined engagement. Dog collar 716 is also splined to coupling member 718. The mutual spline tracks for first cone 781 and dog collar 716 eliminates rotational play between the parts and allows both parts to synchronize rotationally with coupling member 718.

Second cone 782, third cone 783, and fourth cone 784 are arranged between first cone 781 and hollow shaft 201. Fourth cone 784 is splined to hollow shaft 701. As dog collar 216 moves to the left in FIG. 7D, the wave springs 727 and 728 are compressed and push against first cone 781. Increased pressure and leftward movement of dog collar 716 engages all of the cones together for synchronized rotation of the hollow shaft 701 with coupling member 718.

In an alternative embodiment where at least one wave spring is in location 779, the dog collar moves leftward, as seen in FIG. 7D, to touch first cone 781 and urge the first cone 781 into engagement with the second cone 782. The wave spring in location 779 compresses with the leftward motion of dog collar 716. Increased leftward movement engages all of the cones together for synchronized rotation of the hollow shaft 701 with coupling member 718.

When uncoupling is performed, hydraulic pressure is released on dog collar 716, as above for dog collar 216. The bias springs 227 and 228 relax and urge dog collar 716 away from the cone clutch and the cone clutch relaxes through its own compliance. When the alternative spring in location 779 relaxes, it adds additional force to urge the cone clutch apart. Cone clutch compliance and alternative spring force relaxes the cone clutch and the cone clutch urges the dog collar 716 away from the cone clutch.

As a final alternative, bias spring 227 may remain in its location as shown in FIG. 7D, and bias spring 228 may be located in alternative location 779.

Figure 7E:
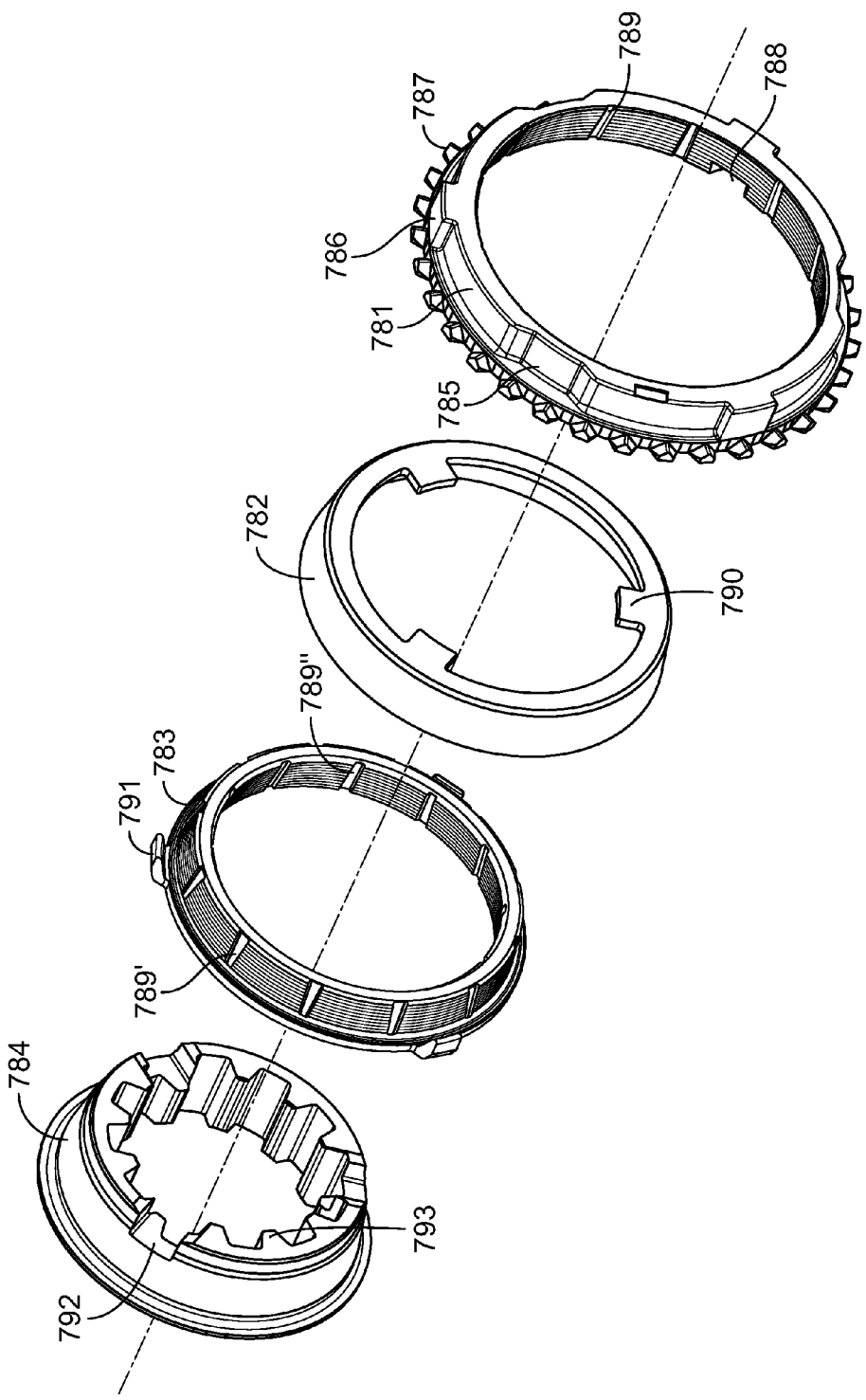
FIG. 7E is an exploded view of the synchronizing assembly of FIG. 7A.

FIG. 7E is an exploded view of the cone clutch synchronizer assembly. First cone 781 has exteriorly facing coupling teeth 787, exterior coupling enhancements 786, exterior coupling areas 785, interior lubrication grooves 789, interior coupling notches 788, and interior friction grip areas between lubrication grooves 789. Second cone 782 has coupling detents 790. The exterior and interior of second cone 782 is configured to grip friction areas on first cone 781 and third cone 783. Third cone 783 has friction grip areas between interior and exterior lubrication grooves 789' and 789". Third cone 783 also has coupling fingers 791 for seating second cone 782. Fourth cone 784 has coupling slots 792 for interfacing with coupling detents 790, and has grips 793 for interfacing with grooves on hollow shaft 701.

Figure 7F:
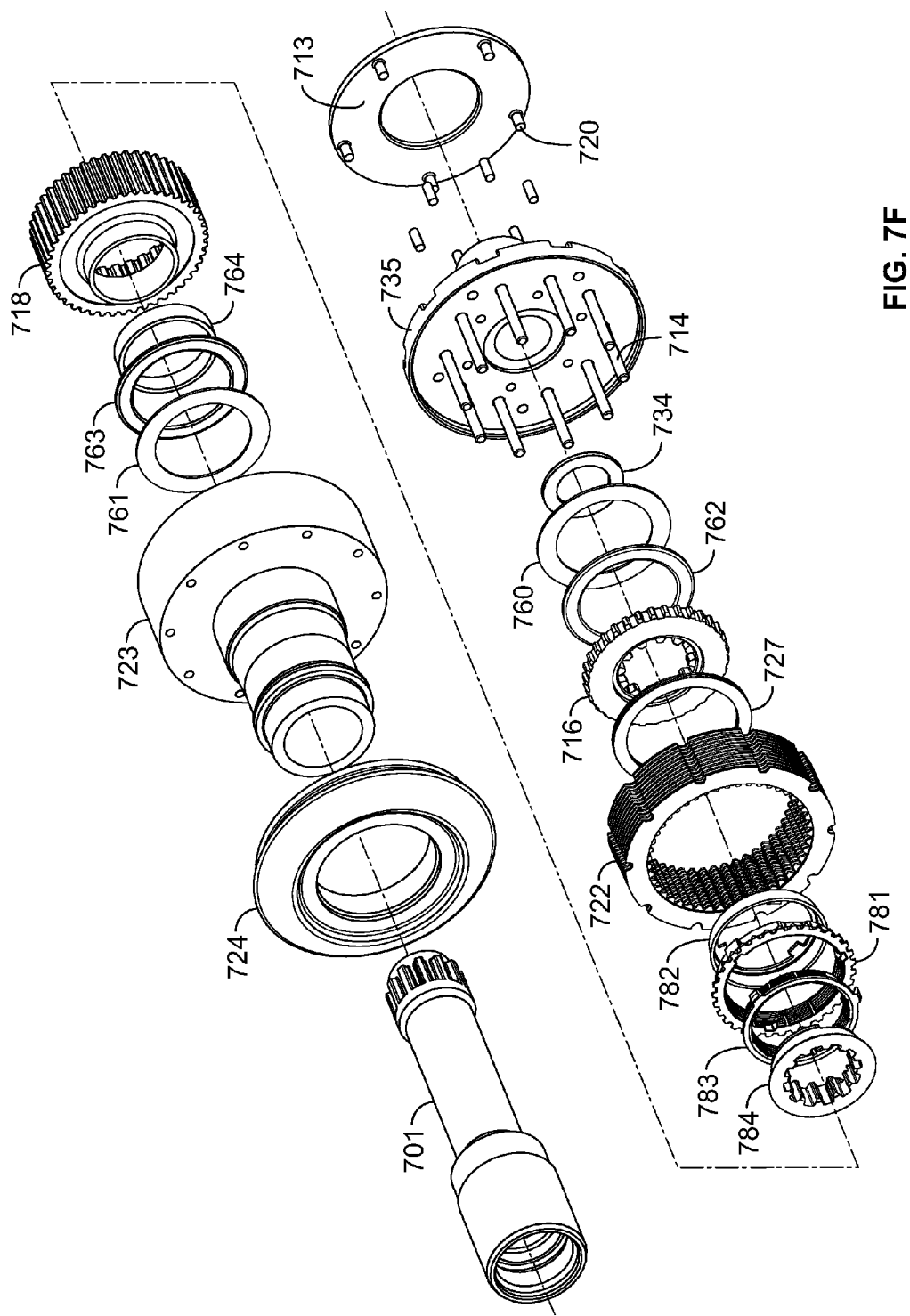
FIG. 7F is an exploded view of coupling features, piston actuation features, and the synchronizing assembly of FIG. 7A.

FIG. 7F is an exploded view of the power transfer portions of PTU 101. Hollow shaft 701 is shown with grooves for interfacing with grips on fourth ring 784. Ring gear 724 is shown without means to couple with pinion gear 107. Coupling grooves 759 and splining grooves can be seen on coupling member 718. Splining portions can be seen on clutch pack 222. Only a single bias spring 727 is shown near dog collar 716, which also includes splining grooves. The splining grooves may be used for mating with hollow shaft 701. The splining grooves may also have portions that function as dog clutch features.

Similar to the first embodiment, the synchronizing cone clutch in series with a dog clutch in series with a multi-plate wet clutch replaces the function of an ECC (electronic control coupling) in the rear of the drivetrain. The use of a dog clutch with bias springs and a clutch having compliance creates a system with good separation within the PTU, thereby eliminating viscous drag and other losses that can occur in a non-powered secondary drive system. Friction and viscous losses between the transaxle and drive line can also be removed.

Also similar to the first embodiment, to disable the PTU and idle the secondary drive system, pressure is released from outer discs of clutch pack 722, then the rear wheel dog clutches are disengaged, then the dog collar 716 and cone clutch are disengaged.

When reengaging the rear driveline, the dog collar 716 and cone clutch are activated to overcome the inertia of idling. The inertia of idling can be overcome at least as quickly as the speed seen in a gear shift in a manual transmission.

The components of the PTU and vehicle driveline are composed of materials able to withstand the torque and heat capacity needed to overcome the rear driveline inertia and bring the rear driveline up to speed. Brass, or other friction materials, may be used to grab very quickly without slipping for long periods in order to get idled parts up to speed quickly. Once the rear wheel dog clutches are within a speed range comparable to the primary drive system, piston 711 is activated to engage dog collar splined to coupling member 718, inner clutch discs splined to coupling member 718, hollow shaft 701, and cone clutch. The outer clutch discs splined to the flange half spool 723 are lastly engaged to complete the power transfer to the rear driveline.

The ability to idle the rear driveline allows for at least a 1-2% fuel economy savings. The idling capacity can also bring the fuel economy differences between AWD and FWD to within 1 mpg.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

For instance, other motive devices having at least one primary drive axle coupled to a secondary auxiliary drive system can benefit from the improved packaging of the disclosed PTU. The other motive devices can have a number of wheels other than four. As another example, other hydraulic control systems can be used in place of the hydraulic control units shown in FIGS. 5 and 6. Hydraulically actuated systems, such as outboard motors, can also benefit from the tolerancing oil port.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A power transfer unit for a motive device, comprising:
an outer housing;
an inner housing comprising first spline recesses;
a rotatable hollow shaft bisecting the inner housing, the hollow shaft comprising second spline recesses and first dog-clutch coupling features;
a torque transferring clutch comprising at least one wet-clutch surface and spline connections to the second spline recess of the rotatable hollow shaft;
a dog collar adjacent the torque transferring clutch, the dog collar comprising a first surface and a second surface, the second surface comprising second dog-clutch coupling features and a wet-clutch coupling surface;
a piston housing located between the outer housing and the dog collar; and
a piston assembly comprising a piston in the piston housing,
wherein the piston assembly is configured to provide actuation forces to the torque transferring clutch by moving the dog collar,
wherein, when the piston assembly provides the actuation forces, the second dog-clutch coupling features of the dog collar engage the first dog-clutch coupling features of the hollow shaft, and the wet-clutch coupling surface of the dog-collar engages the at least one wet-clutch surface of the torque transferring clutch, and
wherein, when the torque transferring clutch receives the actuation forces, the inner housing rotates.

2. The power transfer unit of claim 1, wherein the torque transferring clutch comprises a plurality of friction discs.

3. The power transfer unit of claim 1, further comprising a spool and a clutch pack, the clutch pack comprising first discs splined to the inner housing and second discs splined to the spool, wherein, when the piston provides additional actuation forces, the first discs and the second discs couple to rotate the spool with the inner housing and the hollow shaft.

4. The power transfer unit of claim 1, wherein the torque transferring clutch comprises one of a single, double, or triple cone clutch and at least one cone of the torque transferring clutch comprises spline connections to the first spline recesses of the inner housing.

5. The power transfer unit of claim 1, wherein the dog collar further comprises an outer surface with spline connections to the inner housing.

6. A power transfer unit for a motive device, comprising:
an outer housing;
a coupling member;
a torque transferring dog collar comprising first radial dog members and second radial dog members;
a torque transferring cone clutch comprising a cone member with exterior dog members;
a piston housing located between the outer housing and the torque transferring clutch;
a piston assembly comprising a piston in the piston housing; and
a rotatable hollow shaft bisecting the coupling member, the hollow shaft comprising external dog members,
wherein the piston assembly is configured to provide actuation forces to the torque transferring dog collar, and, when the dog collar receives the actuation forces, the first radial dog members engage the exterior dog members of the cone member and the second radial dog members couple to the external dog members of the hollow shaft, and
wherein, when the torque transferring cone clutch receives the actuation forces from the dog collar, the torque transferring cone clutch rotates the coupling member.

7. The power transfer unit of claim 6, wherein the torque transferring cone clutch is a single, double, or triple cone clutch.

8. The power transfer unit of claim 6, further comprising a second cone, wherein the torque transferring cone clutch comprises at least two friction grip areas, and wherein, when the torque transferring cone clutch receives the actuation forces the dog collar presses against the second cone and the at least two friction grip areas engage.

9. The power transfer unit of claim 6, wherein the coupling member comprises first spline-coupling surfaces on an exterior surface and second spline-coupling surfaces on an interior surface, and the power transfer unit further comprises:
an inner housing with internal spline couplings;
a clutch pack comprising inner friction discs splined to the first spline-coupling surfaces and outer friction discs interleaving the inner friction discs, the outer friction discs spline-coupled to the inner housing; and
splines on a second cone for coupling to the second spline-coupling surfaces,
wherein, when the dog collar presses against the second cone, the coupling member and the inner friction discs rotate, and
wherein, when the piston provides additional actuation forces, the additional actuation forces compress the outer friction discs into rotative engagement with the inner friction discs and the inner housing rotates.

10. The power transfer unit of claim 6, further comprising at least one bias spring configured to compress under the actuation forces of the piston and further configured to provide separation forces to the torque transferring clutch.

11. The power transfer unit of claim 10, wherein the at least one bias spring is positioned to interpose a second cone and a pressing surface of the dog collar.

12. The power transfer unit of claim 10, wherein the at least one bias spring is positioned to interpose the coupling member and a second cone.

13. A power transfer unit for a motive device, comprising:
an outer housing;
a coupling member with internal coupling grooves;
a torque transferring dog collar comprising first radial dog members and outer spline members;
a torque transferring cone clutch comprising a cone member with dog members;
a piston housing located between the outer housing and the torque transferring clutch; and
a piston assembly comprising a piston in the piston housing,
wherein the piston assembly is configured to provide actuation forces to the dog collar, and, when the dog collar receives the actuation forces, the first radial dog members engage the dog members of the at least one cone member and the outer spline members couple to the internal coupling grooves, and
wherein, when the torque transferring cone clutch receives the actuation forces from the dog collar, the coupling member rotates.

14. The power transfer unit of claim 13, wherein the torque transferring cone clutch comprises:
a first cone comprising exteriorly facing coupling teeth coupled to the internal grooves, an interior surface comprising friction grips, and interior coupling notches;
a second cone comprising exterior friction grips for coupling with the interior surface of the first cone, interior friction grips, and coupling detents; and
a third coupling cone comprising exterior friction grips for coupling with the interior surface of the second cone, interior friction grips, and coupling fingers for seating the second cone,
wherein the cone member is a fourth cone comprising internal grips, exterior friction grips for coupling with the interior surface of the third cone, and coupling slots for interfacing with coupling detents.

15. The power transfer unit of claim 13, wherein the cone-clutch is a single, double, or triple cone clutch.

16. The power transfer unit of claim 13, further comprising:
a second cone in the torque transferring cone clutch, and wherein the torque transferring cone clutch comprises at least two friction grip areas; and
a rotating hollow shaft bisecting the power transfer unit and coupled to the at least one cone member, the hollow shaft comprising external dog-clutch coupling features,
wherein the torque transferring dog clutch further comprises second radial dog members,
wherein, when the torque transferring clutch receives the actuation forces, the second radial dog members engage the external dog-clutch coupling features on the hollow shaft, and the dog collar presses against the second cone to engage the at least two friction grip areas.

17. The power transfer unit of claim 13, wherein the coupling member further comprises external spline-coupling surfaces, and the power transfer unit further comprises:
an inner housing;
a clutch pack comprising inner friction discs splined to the exterior spline-coupling surfaces and outer friction discs interleaving the inner friction discs, the outer friction discs coupled to the inner housing; and
a second cone comprising external splines for coupling to the interior coupling grooves, wherein, when the dog collar presses against the second cone, the coupling member and the inner friction discs rotate, and wherein, when the piston assembly provides additional actuation forces, the additional actuation forces compress the outer friction discs into rotative engagement with the inner friction discs.

18. The power transfer unit of claim 13, wherein the power transfer unit comprises at least one bias spring configured to compress under the actuation forces of the piston and further configured to provide separation forces to the torque transferring clutch.

19. The power transfer unit of claim 18, wherein the at least one bias spring is positioned to interpose a second cone and a pressing surface of the dog collar.

20. The power transfer unit of claim 18, wherein the at least one bias spring is positioned to interpose the coupling member and a second cone.

* * * * *